ic Energy Commission

UNITED STATES PATENT OFFICE 2,506,945

TREATMENT OF PITCHBLENDE ORES

Henry C. Thomas and Andrew S. Tomcufcik, New Haven, Conn., assignors to the United States of America as represented by the United States Atomic Energy Commission No Drawing. Application May 10, 1948, Serial No. 26,234

14 Claims. (Cl. 23—14.5)

This invention relates to the treatment of pitchblende ores and more particularly to the recovery of radium and uranium values contained therein.

An extremely efficient process for the purification of uranium comprises the extraction of a nitric acid solution of uranyl nitrate with an organic solvent. Consequently it is desirable to treat pitchblende ore with nitric acid to obtain directly a solution upon which the solvent extraction process may be carried out.

However it has not been possible with prior processes to recover the radium values along with the uranium values by direct treatment of pitchblende ores with nitric acid. To recover the radium values as nitric acid soluble salts it has been found necessary to treat the ore prior to leaching by a step such as by roasting with sodium carbonate.

This invention has as an object an improved process for the treatment of pitchblende ores.

A further object is to provide an improved process for the recovery of radium from pitchblende ores.

A still further object is the simultaneous extraction of radium and uranium values from pitchblende ores.

Other objects and advantages of the invention will become apparent from the following detailed description.

In accordance with the present invention it has been discovered that the radium values may be extracted substantially completely along with the uranium values by digesting the pitchblende ores with nitric acid containing ammonium nitrate or sodium nitrate or both of these salts.

The entire process for the extraction and recovery of the radium value is, as follows: The pitchblende ore is first comminuted to a finely divided state. This comminuted ore is then digested with nitric acid containing ammonium nitrate or sodium nitrate or both. By this digestion the uranium and radium values, as well as lead values and some others are dissolved. The solution containing these values may be separated from the gangue of insoluble matter by filtration or other suitable means. The radium and lead values may then be easily separated from the uranium values by adding sulfuric acid to the solution. This causes the formation of insoluble radium sulfate and lead sulfate, the radium sulfate being carried from solution with the lead sulfate. The uranium values remain in solution and after separation of the precipitated sulfates containing radium and lead may be treated for further purification as, for example, by an organic solvent extraction process. The radium may be isolated from the lead values by treating the combined sulfates with ammonium acetate thus leaching out the lead sulfate and obtaining a residue of radium sulfate.

To facilitate the solution of the ore it is preferable that it be reduced to a finely comminuted state. Though greater degrees of fineness give a faster rate of solution, a fineness of ore capable of passing 40 mesh has proved to be suitable.

The concentration and the quantity of nitric acid used may be varied between wide limits. Amounts of acid from slightly over the stoichiometric amount to four times the stoichiometric amount or more have proved suitable. The stoichiometric amount throughout this application is based on that amount of nitric acid needed to react with the $U_3O_8$ present in the ore, assuming 7 moles of $HNO_3$ per mole of $U_3O_8$. Acid concentrations from about 10% $HNO_3$ to about 70% $HNO_3$ have been found suitable.

The amount of ammonium nitrate or sodium nitrate, or combination of the two salts should be in a ratio of at least $\frac{1}{5}$ mole per mole of nitric acid to give beneficial results. A lower ratio may be used with the result of slightly less extracting efficiency in respect to the radium while a higher ratio may be used with no deleterious effects, but the ratio of $\frac{1}{5}$ mole of nitrate salt per mole of $HNO_3$ is preferred.

The digestion temperature may vary from slightly above room temperature to the boiling point of the digesting acid solution, the preferred temperature being approximately 80°–90° C.

The time of digestion is, of course, dependent upon the other variables such as acid concentration, temperature of digestion, etc. Periods as short as one hour or as long as 12 hours are suitable, but in general a short period is desirable for reasons which will become apparent hereinafter.

A particularly suitable digestion procedure is the digestion of ore comminuted to −40 mesh with double the stoichiometric amount of 35% $HNO_3$ containing approximately $\frac{1}{5}$ mole of $NaNO_3$ and/or $NH_4NO_3$ per mole of $HNO_3$ for a period of three hours, at a temperature of approximately 80°–90° C.

The following are specific examples embodying the present invention and are to be taken as illustrative and not as limitations on the present invention.

EXAMPLE I

Samples of 100 grams of pitchblende ore ground to −40 mesh and containing $1.91 \times 10^{-5}$ grams of radium and 67.8% $U_3O_8$ were digested with 1.18 moles of 35% $HNO_3$ (this being approximately twice the stoichiometric amount) for a period of three hours at 80–90° C. The gangue was filtered from the hot solution. In three samples thus treated the amount of radium which passed into solution averaged 87.5%

Identical samples were treated similarly but with the addition of 20 grams of $NaNO_3$ to the ore prior to the digestion. The amount of radium passing into solution in these instances was in every case greater than 95.5%.

EXAMPLE II

Table I below illustrates further the benefit of adding $NaNO_3$ or $NH_4NO_3$ or both to improve the degree of extraction of the radium. In each of these experiments the samples were 100 grams of −40 mesh ore containing 67.8% $U_3O_8$ and $1.91 \times 10^{-5}$ grams of radium. The digestions were carried out with twice the stoichiometric amount of 35% $HNO_3$ for a digestion period of 3 hours at 80–90° C. The added nitrates were mixed with the ore prior to the digestion:

*Table I*

| Experiment No. | Nitrate Added | Percent Radium Dissolved |
|---|---|---|
| 1 | 0 | 86.9 |
| 2 | 20 gm. $NaNO_3$ | 95.5 |
| 3 | 20 gm. $NH_4NO_3$ | 99.5 |
| 4 | 20 gm. $NaNO_3$ + 1 gm. $NH_4NO_3$ | 94.5 |
| 5 | 20 gm. $NaNO_3$ + 5 gm. $NH_4NO_3$ | 95.3 |
| 6 | 20 gm. $NaNO_3$ + 10 gm. $NH_4NO_3$ | 99.0 |

EXAMPLE III

To determine the effect of $NaNO_3$ in longer periods of digestion, the runs set forth in Table II were carried out on 100 gram samples of ore of −40 mesh using twice the stoichiometric amount of 35% $HNO_3$ for the digestion. The $U_3O_8$ content of the ore again was 67.8% with a radium content of $1.91 \times 10^{-5}$ grams per 100 gram sample. The digestions were carried out at 80–90° C. and the filtration from the gangue was made while the solution was hot. The addition of the $NaNO_3$ in runs 12, 13 and 14 was made to the ore prior to digestion.

*Table II*

| Experiment No. | $NaNO_3$ Added (Grams) | Time Digestion (Hours) | Percent Radium Dissolved (average) |
|---|---|---|---|
| 7, 8, 9 | 0 | 3 | 87.5 |
| 10 | 0 | 4.5 | 84.8 |
| 11 | 0 | 6 | 80.1 |
| 12 | 20 | 3 | 95.7 |
| 13 | 20 | 4.5 | 93.5 |
| 14 | 20 | 6 | 95.5 |

The beneficial effect of the added nitrate during extended periods of digestion is made apparent by the tests in the above example.

The exact function of the added nitrate salts is not definitely known. However, their presence appears to inhibit the formation of sulfates which normally are formed from sulfur present in the ore as sulfides. The gradual oxidation of the sulfides and sulfites to sulfates and the subsequent formation and precipitation of the previously dissolved radium as radium sulfate is thought to be the cause of the lower radium recovery in extended periods of digestion. As the tests in Example III illustrate, the presence of added $NaNO_3$ in some manner inhibits the reprecipitation of the radium extracted from the ore though the period of digestion is extended. This effect becomes especially valuable during plant operations where quite often solutions must be held for longer periods of time than expected before filtration because of equipment failure or other interfering matters.

The value of radium is, of course, well known and the importance of recovering as much as possible is quite apparent. The process of the present invention therefore is a valuable improvement over the prior art in making possible the simultaneous recovery of radium and uranium from pitchblende ores. The ability to recover the radium values in the manner of this invention may make it economically feasible to work ores which could not be worked if prior procedures were to be followed.

The foregoing illustrations and embodiments of the present invention are not intended to limit its scope, but such modifications and variations may be made as fall within the spirit of the invention and the scope of the appended claims.

We claim:

1. A process for extracting uranium values and radium values from pitchblende ores which comprises reducing the ores to a comminuted condition, thereafter reacting the ore with nitric acid in the presence of an additive from the class consisting of ammonium nitrate and sodium nitrate and a mixture of the two to dissolve the radium values and uranium values and thereafter recovering the extracted uranium and radium values.

2. A process for recovering radium values from pitchblende ores which comprises reducing the ore to a comminuted condition, reacting the comminuted ore with nitric acid containing an additive from the class consisting of ammonium nitrate and sodium nitrate and a mixture of the two, separating the solution thereby obtained containing the extracted radium values, together with the uranium values and lead values present in the pitchblende ore, adding sulphuric acid to the separated solution to precipitate the radium values as radium sulfate together with the lead values as lead sulfate, and thereafter separating the precipitate of radium sulfate and lead sulfate from the remaining solution.

3. A process for extracting radium values from pitchblende ores which comprises reacting the ore with nitric acid containing an additive from the class consisting of ammonium nitrate and sodium nitrate and a mixture of the two.

4. A process for extracting radium values from pitchblende ores which comprises reacting the ore with nitric acid containing ammonium nitrate.

5. A process for extracting radium values from pitchblende ores which comprises reacting the ore with nitric acid containing sodium nitrate.

6. A process for extracting radium values from pitchblende ores which comprises reacting the ore with nitric acid containing a mixture of sodium nitrate and ammonium nitrate.

7. A process for extracting uranium and radium and other values from pitchblende ores which comprises reacting the ore with nitric acid containing approximately one-fifth mole of an additive from the class consisting of sodium nitrate, ammonium nitrate and mixtures thereof per mole of nitric acid.

8. The process of claim 7 wherein the additive is sodium nitrate.

9. The process of claim 7 wherein the additive is ammonium nitrate.

10. The process of claim 7 wherein the additive is a mixture of ammonium nitrate and sodium nitrate.

11. A process for extracting uranium, radium and other values from pitchblende ores which comprises reacting the ore with double the stoichiometric amount of nitric acid needed to react with the $U_3O_8$ present in the ore, said acid containing approximately one-fifth mole of an additive from the class consisting of sodium nitrate, ammonium nitrate and mixtures thereof per mole of nitric acid.

12. The process of claim 11 wherein the additive is sodium nitrate.

13. The process of claim 11 wherein the additive is ammonium nitrate.

14. The process of claim 11 wherein the additive is a mixture of sodium nitrate and ammonium nitrate.

HENRY C. THOMAS.
ANDREW S. TOMCUFCIK.

REFERENCES CITED

The following references are of record in the file of this patent:

UNITED STATES PATENTS

| Number | Name | Date |
| --- | --- | --- |
| 1,165,693 | Moore | Dec. 28, 1915 |
| 1,471,514 | Elliott | Oct. 23, 1923 |